(12) United States Patent
King et al.

(10) Patent No.: US 7,376,631 B2
(45) Date of Patent: May 20, 2008

(54) METHOD, APPARATUS AND COMPUTER PROGRAM PRODUCT FOR REPORTING ENERGY CONSUMPTION

(75) Inventors: Jennifer E. King, Boulder, CO (US);
Robert R. Peterson, Rockledge, FL (US); Jon F. Richter, Austin, TX (US); Ian P. Spivey, Cambridge, MA (US); Tyron Jerrod Stading, Austin, TX (US); Rhys Ulerich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/138,830

(22) Filed: May 26, 2005

(65) Prior Publication Data

US 2006/0259447 A1    Nov. 16, 2006

(51) Int. Cl.
    *G01R 11/56*    (2006.01)

(52) U.S. Cl. ..................................... 705/412

(58) Field of Classification Search ................. 705/412
    See application file for complete search history.

(56) References Cited

U.S. PATENT DOCUMENTS

| | | | |
|---|---|---|---|
| 4,804,957 A | | 2/1989 | Selph |
| 5,032,833 A | * | 7/1991 | Laporte .................. 340/825.02 |
| 5,684,379 A | * | 11/1997 | Svedoff ...................... 320/125 |
| 6,618,709 B1 | | 9/2003 | Sneeringer |
| 6,633,823 B2 | | 10/2003 | Bartone |
| 2002/0072868 A1 | | 6/2002 | Bartone |
| 2002/0109607 A1 | * | 8/2002 | Cumeralto et al. .... 340/870.02 |
| 2004/0024717 A1 | | 2/2004 | Sneeringer |

(Continued)

FOREIGN PATENT DOCUMENTS

WO    WO94/08381    *    4/1994

OTHER PUBLICATIONS

Wittenberg, Diane O., "Charging Ahead With Electric Vehicles (While Motor Vehicle Producers Are Introducing Electric Vehicles, the Key to Their Popularity Lies in How They Perform as Vehicles, and That Fueling Is More Convenient Than Trips to Gas Stations)," Business Forum, Spring 1997, vol. 22, No. 2, p. 39.*

(Continued)

*Primary Examiner*—John W. Hayes
*Assistant Examiner*—Nathan H. Erb
(74) *Attorney, Agent, or Firm*—Diana L. Roberts-Gerhardt; Anthony V. S. England

(57) ABSTRACT

Energy consumption meters are associated with owners who hold accounts with a power supplier. The meters are assigned meter identifiers and identifiers for their respective owners. Such a meter may be a parent meter having associated submeters. In response to being plugged into a power source from the power supplier, such a meter reports its owner identifier and meter identifier to the supplier. Also, in response to being plugged into a power source supplied by one of the parent meters, a meter communicates with the parent meter. This establishes that the parent meter is associated with the submeter. The submeter measures energy delivered reports this to the power supplier. Also, the indicated association of the submeter to the parent meter is reported to the power supplier. The receipt of this information enables the power supplier to debit and credit owner accounts in a manner permitting temporary associations of meters.

17 Claims, 3 Drawing Sheets

U.S. PATENT DOCUMENTS

| | | | |
|---|---|---|---|
| 2004/0083167 A1* | 4/2004 | Kight et al. | 705/40 |
| 2004/0139038 A1* | 7/2004 | Ehlers et al. | 705/412 |
| 2004/0167834 A1* | 8/2004 | Koskinen et al. | 705/30 |
| 2006/0001414 A1* | 1/2006 | Angerame et al. | 324/103 R |

OTHER PUBLICATIONS

"Submetering for C&I Customers," Itron, Inc. web site http://www.itron.com/solutions/ci_submetering.html.

"Residential Submetering," Itron, Inc. web site http://www.itron.com/solutions/residential_submetering.html.

Walo, Doug, "Utilizing Technology with Wireless Submetering," Electricsmarts web site, http://www.electricsmarts.com/content/submetering_wireless.asp.

Orchard, Rob, "Is this the Future?" Bus & Coach Buyer, Jun. 11, 2004, pp. 16-18.

"New Electricity Meter from ABB," Project Monitor web site, http://www.projectsmonitor.com/detailnews.asp?newsid=7860.

"Programmable Systems Spread," Home Energy Magazine web site, http://www.homeenergy.org/archive/hem.dis.anl.gov/eehem/95/950113.html.

Dahle, David, "Centron (1999 to present)," Dave's old Watthour Meter webpage, http://www.watthourmeters.com/, http://www.watthourmeters.com/modern/centron.html.

"Power Meters at Net-Metering.com," Davidge Controls web site, http://www.net-metering.com/power_meters.html.

"Energy Management Submetering" GE Industrial Systems web site, http://www.geindustrial.com/products/pmcs/ems/submetering.html.

* cited by examiner

METHOD, APPARATUS AND COMPUTER PROGRAM PRODUCT FOR REPORTING ENERGY CONSUMPTION

BACKGROUND OF THE INVENTION

1. Field of the Invention

The present invention relates to metering or reporting of energy consumption, and, more particularly, to enabling temporary associations of parent energy consumption meters and submeters.

2. Related Art

In a number of circumstances, it is useful for an energy purchaser to use a fixed arrangement of submeters to measure selected portions of the purchaser's overall energy consumption. (Meters for measuring energy consumption are well known. See, for example, http://www.net-metering-.com/power_meters.html, http://www.watthourmeters.com, and, in particular, http://www.watthourmeters.com/modern/centron.html.) Measuring electrical use in apartment complexes is one such submetering application that is common. It is economical to use fixed electrical submeters in this situation because each apartment's consumption is large and the arrangement of submeters remains fixed for a long time. Submetering is generally not economical in situations where the total amount of energy consumption is small, the portion of overall energy consumption that is of interest is small or the submetering would be temporary. For example, although patrons commonly plug notebook computers and the like into electrical outlets in public places like libraries, book stores, coffee shops, hotel lobbies and airports, these outlets are typically not submetered because they supply only a little energy and also because patrons use them for only a short while.

A new situation is developing in which energy consumption is moderate, widespread and highly temporary. That is, the number of hybrid automobiles is increasing dramatically. These automobiles may need to be electrically recharged in public places, such as at parking garages or street side parking spaces. While this could be facilitated by installing electrical outlets having coin-operated timers, this tends to be inconvenient for the user. Thus, a need exists for improvements in energy consumption submetering.

SUMMARY

The foregoing need is addressed in the present invention. According to one form of the invention, energy consumption meters are associated with respective owners who hold accounts with a power supplier. The meters are assigned meter identifiers and identifiers for their respective owners. The owner identifiers assigned to the meters may be related by the power supplier to their account holders. Such meters may be parent meters or submeters. A parent meter may have a number of associated sub meters. In response to being plugged into a power source from the power supplier, such a meter reports its owner identifier and meter identifier to the supplier. Also, in response to being plugged into a power source supplied by one of the parent meters, a meter configured as a submeter communicates with the parent meter. This communication establishes that the parent meter is associated as a parent meter with the submeter. The submeter measures energy consumption for loads supplied by the submeter and reports the energy consumption to the power supplier. Also, the indicated association of the submeter to the parent meter is reported to the power supplier.

In one aspect of the invention, the communication establishing that the parent meter is associated as a parent meter with the submeter includes the submeter receiving the parent meter's identifier. In this case, the reporting of the indicated association to the power supplier may include the submeter sending the parent meter's identifier to the power supplier.

The receipt of the indicated association, identifiers, and power consumption measurements enables the power supplier to debit and credit owner accounts for energy consumption in a manner that permits temporary associations of parent meters and submeters. Other variations, objects, advantages, and forms of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment read in conjunction with the accompanying drawings.

DETAILED DESCRIPTION OF THE PREFERRED EMBODIMENT

In the following detailed description of the preferred embodiments, reference is made to the accompanying drawings illustrating embodiments in which the invention may be practiced. It should be understood that other embodiments may be utilized and changes may be made without departing from the scope of the present invention.

The drawings and detailed description are not intended to limit the invention to the particular form disclosed, but on the contrary, the intention is to cover all modifications, equivalents and alternatives falling within the spirit and scope of the present invention as defined by the appended claims.

Figure 1:
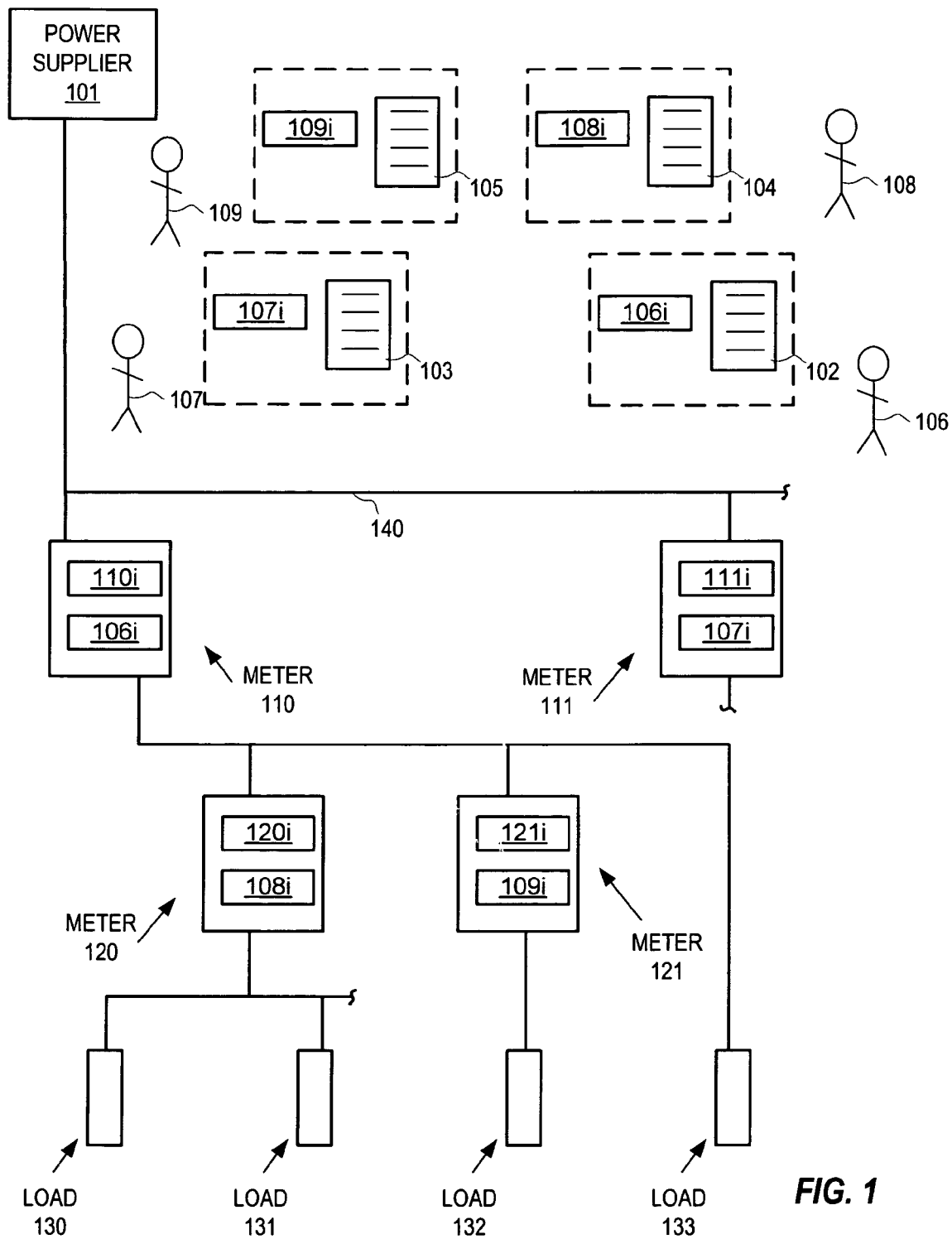
FIG. 1 shows energy consumption meters for some of a power supplier's account holders, according to an embodiment of the present invention.

Referring now to FIG. 1, an illustrative system 100 for an embodiment of the present invention is shown, in which supplier 101 associates energy consumption meters 110, 111, 120, and 121 with owners 106, 107, 108, and 109, respectively, according to an embodiment of the invention. In the particular system 100 illustrated, the energy provided to owners 106-109 by power supplier 101 is electrical energy, which is delivered by conductors of an electrical distribution network 140. Owners 106, 107, 108, and 109 hold accounts 102, 103, 104, and 105, respectively, with power supplier 101. To document the associations, supplier 101 initializes meters 110, 111, 120, and 121 with assignments of meter identifiers 110*i*, 111*i*, 120*i*, and 121*i*, respectively, and identifiers 106*i*, 107*i*, 108*i*, and 109*i* for their respective owners 106, 107, 108, and 109. Likewise, supplier 101 initializes accounts 102, 103, 104, and 105 with indications of their respective owner associations by recording identifiers 106*i*, 107*i*, 108*i*, and 109*i* in the respective accounts 102, 103, 104, and 105. In this manner, a supplier can post entries to the proper account upon receiving energy consumption reports and an owner identifier from a meter. For example, power supplier 101 may relate owner identifiers 106*i*, 107*i*, 108*i*, and 109*i* to the proper account holders 106, 107, 108, and 109, in response to receiving owner identifiers 106*i*, 107*i*, 108*i*, and 109*i* from the respective meters. That is, owner identifiers 106*i*, 107*i*, 108*i*, and 109*i* are assigned to meters 110, 111, 120, and 121, respectively. Accordingly, meters 110, 111, 120, and 121 send their owner identifiers 106*i*, 107*i*, 108*i*, and 109*i* to power supplier 101.

More particularly, note that in the illustrated arrangement, meter 110 is a parent meter and meters 120 and 121 are submeters (loads) of that parent meter 110. That is, parent meter 110 supplies energy from supplier 101 to submeters 120 and 121. In the particular arrangement shown, submeter 120 supplies loads 131 and 132, submeter 121 supplies load 132, and meter 110, in addition to supplying submeters 120 and 121, supplies load 133, which is not submetered. As is shown, a parent meter may have a number of associated submeters. Each parent meter may supply a number of loads. Likewise, each submeter may supply a number of loads.

Meters 110, 111, 120, and 121 report their respective owner identifiers 106*i*, 107*i*, 108*i*, and 109*i* and meter identifiers 110*i*, 111*i*, 120*i*, and 121*i* to supplier 101. Meters 110, 111, 120, and 121 do this in response to being plugged into distribution system 140, which supplies power to the meters 110, 111, 120, and 121 from power supplier 101. Then, meters 110, 111, 120, and 121 measure the energy they deliver to their respective loads and, correspondingly, the energy consumed by the loads. That is, meter 110 reports energy delivered to its loads (submeters 120 and 121 and load 133) to supplier 101, and meter 120 reports energy delivered to its loads (loads 130 and 131) to supplier 101, and so on.

Also, submeters 120 and 121 communicate with their parent meter 110 in response to being supplied power (via parent meter 110). After being plugged in, submeters 120 and 121 broadcast a request for their parent meter to identify itself. Alternatively, parent meters may periodically broadcast their identity for receipt by a submeter upon the submeter being plugged in. As a result, submeters 120 and 121 receive identifier 110*i* of parent meter 110 to learn that meter 110 is their parent. Accordingly, submeters 120 and 121, in addition to reporting energy consumption for loads 130 and 131, and load 132, respectively, also report parent meter identifier 110*i* to power supplier 101.

Figure 2:
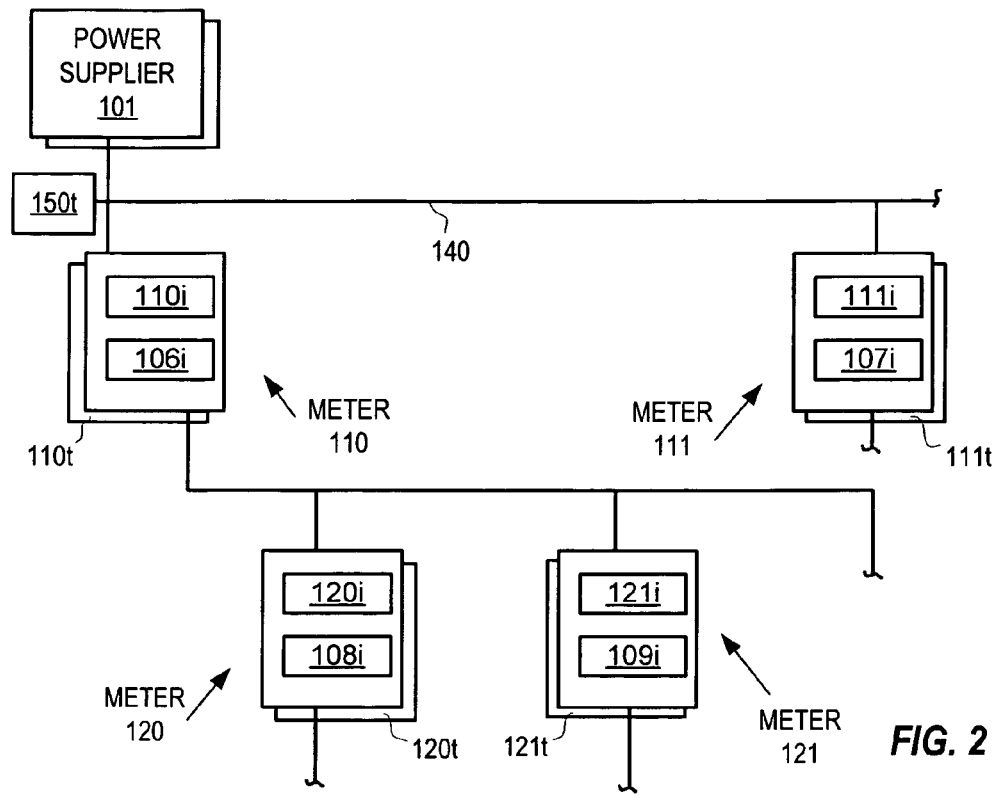
FIG. 2 shows certain details of communication among devices in the system of FIG. 1, according to an embodiment of the invention.

Referring now to FIG. 2, certain details of communication among devices in system 100 are shown, according to an embodiment of the invention. Means for communication among meters 110, 111, 120, 121, and power supplier 101 are well-known and may include wireless or wired communication. Wireless communication may be by a radio frequency ("RF") band signal or a signal in some other frequency band. Wired communication may including communication over conductors of the electrical distribution system 140. In the illustrative embodiment of FIG. 2, the meters have respective meter transceivers 110*t*, 111*t*, 120*t*, and 121*t* for sending and receiving 900-1800 MHz signals according to a well-known GSM ("Global System for Mobile Communications") standard, as described in "An Overview of the GSM System," by Javier Gozalvez Sempere, which is hereby incorporated herein by reference. Also, there is a hub GSM transceiver 150*t* for collecting communications from meter transceivers 110*t*, 111*t*, 120*t*, and 121*t*, and for communicating with a main GSM transceiver 155*t* located at a facility of power supplier 101.

Besides communication means being well-known and applicable to the present context, certain network communication protocols are well-known and applicable to the present invention so that certain hierarchical matters are not problematic. These include hierarchical matters such as how a meter knows it is a parent meter supplying power to a submeter. That is, if meter 120 broadcasts a request for which it wants parent meter 110 to respond, meter 121, for example, may also potentially receive this request, but does not necessarily reply. In one embodiment of the invention, this is at least in part because meter 121 knows it is not a parent meter, since supplier 101 initialized meter 121. Further if a user plugs in another parent meter X between meter 110 and supplier 101, meter X knows not to reply to meter 120's request for its parent meter's id. This may be because of how meter X is initialized. Alternatively, it may be because of communication exchanged among meters that established their place in the hierarchy of network 140. For example, the well-known TCP/IP protocols are suitable for addressing these issues for the present invention, as described by Request for Comments 791, Internet Protocol, DARPA Internet Program Protocol Specification, September 1981; Request for Comments 793, Transmission Control Protocol, DARPA Internet Program Protocol Specification, September 1981; and Request for Comments 1122, Requirements for Internet Hosts—Communication Layers, October 1989, which are hereby incorporated herein by reference. According to an application of these protocols, supplier 101 assigns each transceiver 110*t*, 111*t*, 120*t*, 121*t*, 150*t*, and 155*t* an IP address and subnet masks are used to regulate and direct upstream and downstream communication traffic.

Figure 4:
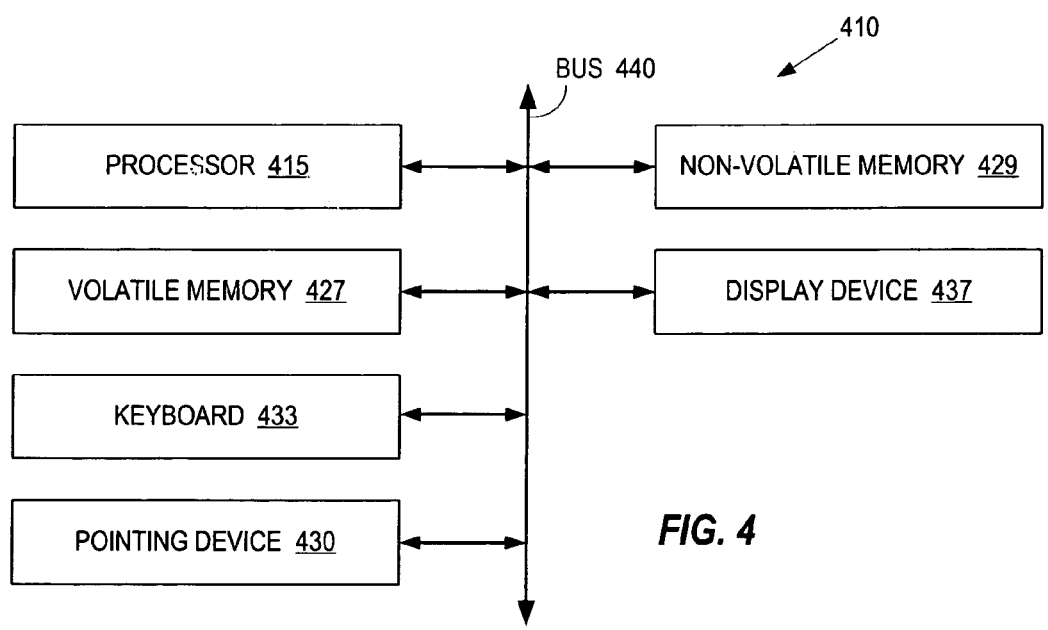
FIG. 4 shows a computer system suitable for instances of the energy consumption meters of FIG. 1, and for maintaining the power supplier accounts shown in FIG. 1, including posting entries to the accounts, according to an embodiment of the present invention.
Figure 3:
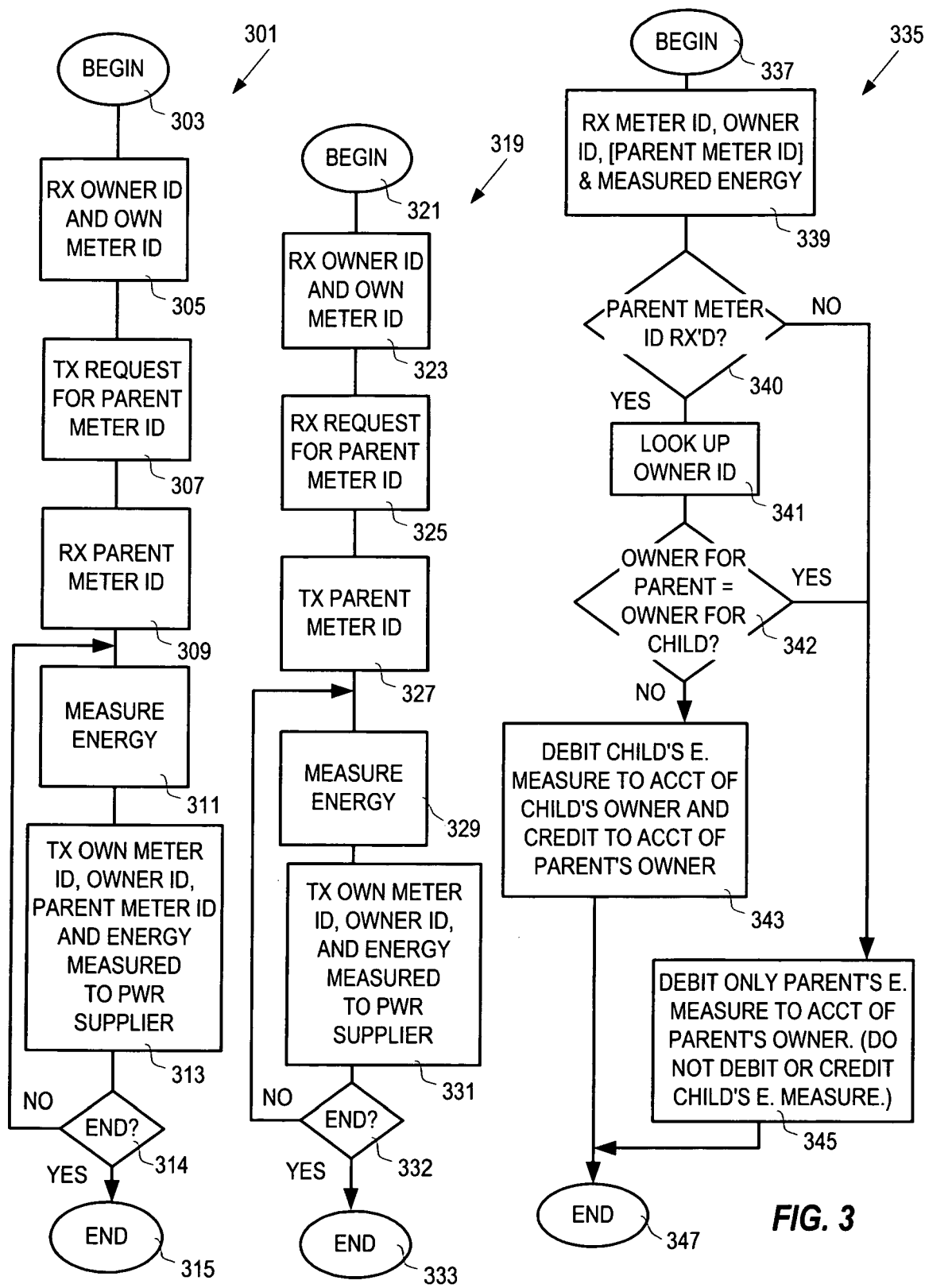
FIG. 3 shows logic that enables posting energy consumption entries to the correct accounts, according to an embodiment of the invention.

Referring now to FIG. 3, logic for initialization of meters, communication among meters and the power supplier, and for the posting of entries to accounts 102, 103, 104, and 105 (see FIG. 1) is shown according to an embodiment of the invention. Process 301, beginning at 303, is for a child meter and meter transceiver, such as meter 110 and transceiver 110*t* (see FIG. 2). (Process 301 may be implemented as a computer program running in a computerized meter and transceiver for which a computer system 410, such as shown in FIG. 4, may be suitable.) At logic block 305, the child meter receives its own meter ID and an ID for its owner from supplier 101, during an initialization, which may be before or after a user installs the meter in a distribution system 140 (see FIG. 1) for actual use. Next, at 307, the child meter broadcasts a request for the meter ID of its parent meter in response to being plugged into a power source supplied by a parent meter. Then, at 309, the child meter receives the parent meter ID from its parent. At 311, the child meter measures energy it delivers to loads that are connected to it. Then, at 313, the child meter transmits a report to the power supplier, including its owner's ID, its own meter ID, the meter ID of its parent, and the amount of energy delivery it has measured during a certain interval. If, at 314, the metering is to end, the logic branches to end at 315. Otherwise, control returns to 311 where the measuring and report transmitting steps repeat.

Process 319, beginning at 321, is for a parent meter and meter transceiver, such as meter 120 and transceiver 120*t* (See FIG. 2). Process 319 may be implemented as a computer program running in a computerized meter and transceiver for which a computer system 410, such as shown in FIG. 4, may be suitable. At logic block 323, the parent meter receives its own meter ID and an ID for its owner from supplier 101 during an initialization, which may be before or after a user installs the meter in a distribution system 140 (see FIG. 1) for actual use. Next, at 325, the parent meter receives a request from a child meter for its own meter ID. Then, at 327, the parent meter sends its meter ID to the requesting child meter. At 329, the parent meter measures energy it delivers to loads that are connected to it. Then, at 331, the parent meter transmits a report to the power supplier, including its owner's ID, its own meter ID and the amount of energy delivery it has measured during a certain interval. If, at 332, the metering is to end, the logic branches to end at 333. Otherwise, the measuring at 329 and report transmitting at 331 are repeated.

Process 335 for supplier 101, beginning at 337, receives reports by means of power supplier transceiver 155$t$ (see FIG. 2) and processes those reports. Meter transceivers, such as transceivers 110$t$ and 120$t$ (see FIG. 2), generate the reports and an intermediary (transceiver 150$t$) relays them. (The processing of the reports may be done by a computer program for process 335 running on a computer system 410 for the power supplier, such as shown in FIG. 4.) At logic block 339 in FIG. 3, the power supplier receives a report from one of the meter transceivers. If the report is from a child meter, such as meter 120 (see FIG. 2), the report will include a parent meter ID, such as ID 110$i$ for meter 110 (see FIG. 2), in addition to the meter's own ID and the ID of the meter's owner. Next, at logic block 340, the process 355 determines if the received report includes a parent meter ID in addition to the reporting meter's own meter ID. If not, this indicates the received report is from a parent meter and process 335 continues to logic block 345, as will be described herein below. If yes, this indicates the received report is from a child meter, so process 335 looks up the owner ID for the parent meter at logic block 341 and continues. Logic block 342 compares the parent meter owner's ID is to the child meter owner's ID. If the owner ID's are not the same, the process 335 branches to logic block 343. Logic block 343 debits the child meter's reported energy measurement to the account of the child meter's owner and credits the same amount to the account of the parent meter's owner. Then, the process 335 ends at 347. If the owner ID's are the same, the process 335 branches to logic block 345. At logic block 345. Logic block 345 debits only energy measurements for reports from parent meters to owner accounts. Then the process 335 ends at 347.

Referring to FIG. 4, a block diagram is shown illustrating a computer system 410 suitable for instances of the energy consumption meters and for maintaining power supplier accounts 102-105 (see FIG. 1), including posting entries to the accounts, according to an embodiment of the present invention. In various embodiments, system 410 takes a variety of forms, including a personal computer system, mainframe computer system, workstation, server, etc. That is, it should be understood that the term "computer system" is intended to encompass any device having a processor that executes instructions from a memory medium.

System 410 includes a processor 415, a volatile memory 427, e.g., RAM, a keyboard 433, a pointing device 430, e.g., a mouse, a nonvolatile memory 429, e.g., ROM, hard disk, floppy disk, CD-ROM, and DVD, and a display device 437 having a display screen. Memory 427 and 429 store program instructions (also known as a "software program"), which are executable by processor 415, to implement various embodiments of a method in accordance with the present invention. Various embodiments implement the one or more software programs in various ways, including procedure-based techniques, component-based techniques, and/or object-oriented techniques, among others. Specific examples include XML, C, C++ objects, Java and commercial class libraries. Components included in system 410 are interconnected by bus 440. A communications device (not shown) may also be connected to bus 440 to enable information exchange between system 410 and other devices.

Those of ordinary skill in the art will appreciate that the hardware in FIG. 4 may vary depending on the implementation. For example, other peripheral devices, such as optical disk drives and the like, may be used in addition to or in place of the hardware depicted in FIG. 4. The depicted example is not meant to imply architectural limitations with respect to the present invention. For example, the processes of the present invention may be applied to multiprocessor data processing systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

Referring again to FIG. 1, it should be understood from the foregoing, that the invention is particularly advantageous because it enables posting energy consumption entries by power supplier 101 to the correct accounts 102, 103, 104, and 105 for owners 106, 107, 108, and 109 in a manner permitting temporary associations of parent meters and submeters. The invention facilitates this posting to correct accounts, since the power supplier 101 receives respective power consumption measurements 110, 111, 120, and 121, various owner identifiers 106$i$, 107$i$, 108$i$, and 109$i$, and meter identifiers 110$i$, 111$i$, 120$i$, and 121$i$ from particular ones of the meters 110, 111, 120, and 121. That is, for example, supplier 101 knows to debit account 104 for owner 108 with energy consumption measurement entries from meter 120, since supplier 101 receives an energy consumption report and an owner identifier 108$i$ from meter 120, and the supplier 101 has initialized account 104 with owner identifier 108$i$. The invention also enables power supplier 101 to properly credit respective ones of the accounts 102-105. That is, for example, supplier 101 knows to credit account 102 for the energy consumption measurement entries from meter 120, since supplier 101 received parent meter identifier 110$i$ from meter 120, and owner identifier 106$i$ from meter 110, and since supplier 101 initialized account 102 with owner identifier 106$i$.

The description of the present embodiment has been presented for purposes of illustration, but is not intended to be exhaustive or to limit the invention to the form disclosed. Many modifications and variations will be apparent to those of ordinary skill in the art. For example, it should be understood that while one manner of initialization has been described herein above, it would be within the spirit and scope of the invention to encompass an embodiment wherein in addition, or in the alternative, supplier 101 initializes accounts 102, 103, 104, and 105 with indications of their respective associations with meters 110, 111, 120, and 121 by means of respective records of meter identifiers 110$i$, 111$i$, 120$i$, and 121$i$.

In another variation, the present invention is useful for a converged highway/railroad vehicle that travels on a rail and draws power from an overhead electrical system. The present invention provides a usage and billing system that is particularly useful when this arrangement is used for commercial transport. According to this application of the present invention, a supplier attaches parent electric meters to electric power lines above the track and a commercial truck draws power from the power lines and has its own submeter to measure the truck's electricity consumption. The submeter has an associated owner and billing account. For example, the owner may be a trucking company. The present invention facilitates a configuration for this system in which numerous companies may provide, maintain or own sections of the overhead electric line and charge a small premium for delivering electricity on their respective section. In this situation, the vehicle's submeter migrates between parent meters when the vehicle crosses from company A's power lines to company B's power lines and continues drawing power with no power interruption, or at least only a brief power blip.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A method for providing power consumption measurement and identity information from power consumption meters to a power supplier in order to permit the power supplier to post power consumption measurements to owner accounts, the method comprising the steps of: determining that a first power consumption meter at a public recharging location for a vehicle has a parent relationship to a second power consumption meter for the vehicle, so that the second meter is a submeter to the first meter, such that according to the parent relationship the second meter is supplying at least part of an energy load supplied by the first meter, wherein determining the parent relationship includes a relationship determining communication between the first and second meters without involving the power supplier in that relationship determining communication, and wherein the relationship determining communication includes: i) sending an identification by the first meter periodically for receipt by any submeter, or ii) sending a request by the second meter to the first meter for identification of the first meter, the request by the second meter being initiated by the second meter in response to the second meter being supplied energy by the first meter; and the second meter receiving from the first meter an identifier for the first meter; and wherein the method further includes: measuring, by the first meter, energy delivered by the first meter; measuring, by the second meter, energy delivered by the second meter; reporting, by at least one of the first and second meters to the power supplier, the respective amounts of energy measured by the meters; reporting, by at least one of the first and second power consumption meters to the power supplier, respective meter identifiers, wherein the power supplier has accounts and each owner identifier identifies a holder of one of the accounts; and reporting the parent relationship to the power supplier, wherein the reporting of the parent relationship includes the second meter reporting the first meter's identifier to the power supplier as a parent meter identifier, so that the power supplier is able to post the reported respective amounts of energy to corresponding owner accounts in response to the information received from the meters, including selectively posting a credit to an account for power delivered by the first meter to the second meter.

2. The method of claim 1, including the steps of: receiving such reporting from the meters; and debiting the second meter's reported energy measurement to an account of the second meter's owner and crediting the second meter's reported energy measurement to an account of the first meter's owner if the first meter's owner identifier is not the same as the second meter's owner identifier, and, if the first meter's owner identifier is the same as the second meter's owner identifier, debiting only one of the reported energy measurements from the first and second meters to an account of the first and second meters' owner.

3. The method of claim 2, including the steps of: determining whether the received reporting from a reporting one of the meters includes the first meter's identifier as a parent meter identifier in addition to the reporting meter's own meter identifier; and looking up the owner identifier for the first meter if the received reporting includes the first meter's identifier as a parent meter identifier in addition to the reporting meter's own meter identifier, and comparing the first meter's owner identifier to the second meter's owner identifier.

4. The method of claim 1, wherein such reporting from a reporting one of the meters is relayed by a transceiver from the reporting meter to the power supplier.

5. A computer program product for enabling a power supplier to post power consumption measurements to owner accounts, wherein the computer program product resides on a computer readable medium having computer readable program code, the program code comprising: a) program code for a plurality of power consumption meters for reporting power consumption measurements and identity information to the power supplier, wherein the power consumption meter program code for the meters comprises: first instructions for causing any computer of a particular meter to receive a meter identifier for an owner of the particular meter, wherein the power supplier has accounts and an owner identifier for the particular meter, wherein the particular meter's owner identifier identifies a holder of one of the accounts; second instructions for causing any computer of the particular meter to send a report from the particular meter to the power supplier, including the particular meter's meter identifier; third instructions for causing any computer of the particular meter to determine that the particular meter has a relation with another meter, wherein one of the meters in the relation is a parent meter at a public recharging location for vehicles and one of the meters is a submeter for a vehicle, such that according to the parent relationship the submeter is supplying at least part of an energy load supplied by the parent meter, wherein determining the relationship includes a relationship determining communication between the parent meter and submeter without involving the power supplier in that relationship determining communication, and wherein the relationship determining communication includes: i) sending an identification by the parent meter periodically for receipt by any submeter, or ii) sending a request by the submeter to the parent meter for identification of the parent meter, the request by the submeter being initiated by the submeter in response to the submeter being supplied energy by the parent meter; and the submeter receiving from the parent meter an identifier for the parent meter; fourth instructions for causing any computer of the particular meter to measure an amount of energy delivered to a load by the particular meter; fifth instructions for causing any computer of the particular meter to report to the power supplier the amount of energy delivered by the particular meter; and sixth instructions for causing any computer of the particular meter to report to the power supplier the relation of the meters, wherein the reporting of the parent relationship includes the submeter reporting the parent meter's identifier to the power supplier as a parent meter identifier; and b) power consumption accounting program code for the power supplier, comprising: instructions for causing any computer for the power supplier to receive reports of the meter relations, relation, identifiers and measured amounts from the power consumption meters; and instructions for causing any computer for the power supplier to post the reported measured amounts of energy to corresponding owner accounts in response to the information received from the meters, including selectively posting a credit to an account for power delivered by the parent meter to the submeter.

6. The computer program product of claim 5, wherein the instructions for causing any computer of the particular meter to determine the meter relations include instructions for causing any computer of the particular meter to communicate between parent meter and submeter.

7. The computer program product of claim 6, wherein the communicating between parent meter and submeter is in response to the submeter being supplied power by the parent meter.

8. The computer program product of claim 6, wherein the communicating between the meters includes receiving the parent meter's identifier by the submeter, and wherein receiving the reports of the meter relations includes receiving the parent meter's identifier from the submeter.

9. The computer program product of claim 8, wherein the power consumption accounting program code includes: instructions for causing any computer for the power supplier to debit the submeter's reported measured amount of energy to an account of the submeter's owner and credit the submeter's reported measured amount of energy to an account of the parent meter's owner if the parent meter's owner identifier is not the same as the submeter's owner identifier, and, if the submeter's owner identifier is the same as the parent meter's owner identifier, debit only one of the reported measured amounts of enemy from the parent meter and submeter to an account of the meters' owner.

10. The computer program product of claim 9, wherein the power consumption accounting program code includes: instructions for causing any computer for the power supplier to determine whether the received reporting from a reporting one of the meters includes a parent meter identifier in addition to the reporting meter's own meter identifier; and instructions for causing any computer for the power supplier to look up the owner identifier for the parent meter if the received reporting includes a parent meter identifier in addition to the reporting meter's own meter identifier, and compare the parent meter's owner identifier to the reporting meter's owner identifier.

11. A system for providing information to a power supplier, the system comprising: a) a plurality of power consumption meters, each particular power consumption meter including logic operable to 1) receive a meter identifier and an owner identifier for an owner of the particular meter, wherein the power supplier has accounts and the particular meter's owner identifier identifies a holder of one of the accounts; 2) send a report from the particular meter to the power supplier, including the particular meter's meter identifier; 3) determine that the particular meter has a relation with another meter, wherein one of the meters in the relation is a parent meter at a public recharging location for vehicles and one of the meters is a submeter for a vehicle, such that according to the parent relationship the submeter is supplying at least part of an energy load supplied by the parent meter, wherein determining the parent relationship includes a relationship determining communication between the parent meter and submeter without involving the power supplier in that relationship determining communication, and wherein the relationship determining communication includes: i) sending an identification by the parent meter periodically for receipt by any submeter, or ii) sending a request by the submeter to the parent meter for identification of the parent meter, the request by the submeter being initiated by the submeter in response to the submeter being supplied energy by the parent meter; and the submeter receiving from the parent meter an identifier for the parent meter; 4) measure an amount of energy delivered to a load by the particular meter; 5) report to the power supplier the amount of energy delivered by the particular meter, and 6) report to the power supplier the relation of the meters, wherein the reporting of the parent relationship includes the submeter reporting the parent meter's identifier to the power supplier as a parent meter identifier; and b) a power consumption accounting system including an accounting system processor and an accounting system storage device connected thereto, wherein the accounting system storage device has stored therein a power consumption accounting program for controlling the accounting system processor, the power consumption accounting program comprising: instructions for causing the accounting system to receive reports of the meter relations, relation, identifiers and measured amounts from the power consumption meters; and instructions for causing the accounting system to post the reported measured amounts of energy to corresponding owner accounts in response to the information received from the meters, including selectively posting a credit to an account for power delivered by the parent meter to the submeter.

12. The system of claim 11, wherein the logic operable to determine the meter relations includes logic operable to communicate between parent meter and submeter.

13. The system of claim 12, wherein the communicating between parent meter and submeter is in response to the submeter being supplied power by the parent meter.

14. The system of claim 12, wherein the communicating between parent meter and submeter includes receiving the parent meter's identifier by the submeter, and wherein receiving the reports of the meter relations includes receiving the parent meter's identifier from the submeter.

15. The system of claim 14, wherein the power consumption accounting program instructions include: instructions for causing the accounting system to debit the submeter's reported measured amount of energy to an account of the submeter's owner and credit the submeter's reported measured amount of energy to an account of the parent meter's owner if the parent meter's owner identifier is not the same as the submeter's owner identifier, and, if the submeter's owner identifier is the same as the parent meter's owner identifier, debit only one of the reported measured amounts of energy from the parent meter and submeter to an account of the meters' owner.

16. The system of claim 15, wherein the power consumption accounting program instructions include: instructions for causing the accounting system to determine whether the received reporting from a reporting one of the meters includes a parent meter identifier in addition to the reporting meter's own meter identifier; and instructions for causing the accounting system to look up the owner identifier for the parent meter if the received reporting includes a parent meter identifier in addition to the reporting meter's own meter identifier, and compare the parent meter's owner identifier to the reporting meter's owner identifier.

17. The system of claim 11, including a transceiver for relaying such reporting from a reporting one of the meters to the power supplier.

* * * * *